United States Patent
Tomson

(10) Patent No.: US 6,322,920 B1
(45) Date of Patent: Nov. 27, 2001

(54) FUEL CELL ISOLATION SYSTEM

(75) Inventor: Louis R. Tomson, Voorheesville, NY (US)

(73) Assignee: Plug Power, Inc., Latham, NY (US)

( * ) Notice: Subject to any disclaimer, the term of this patent is extended or adjusted under 35 U.S.C. 154(b) by 0 days.

(21) Appl. No.: 09/383,467

(22) Filed: Aug. 26, 1999

(51) Int. Cl.⁷ .................................................. H01M 2/00
(52) U.S. Cl. .................. 429/34; 429/1; 429/19; 429/20; 429/34; 429/35; 429/36; 429/57; 429/58
(58) Field of Search .................. 429/1, 19, 20, 429/34, 35, 36, 57, 58

(56) References Cited

U.S. PATENT DOCUMENTS

| | | | |
|---|---|---|---|
| 3,610,809 | * 10/1971 | Eigenbrod et al. | 174/15 |
| 5,858,314 | * 1/1999 | Hsu et al. | 422/211 |
| 6,083,636 | * 7/2000 | Hsu | 429/13 |
| 6,146,780 | * 11/2000 | Cisar et al. | 429/34 |

* cited by examiner

Primary Examiner—Carol Chaney
Assistant Examiner—Dah-Wei Yuan
(74) Attorney, Agent, or Firm—Trop, Pruner & Hu, P.C.

(57) ABSTRACT

A fuel cell stack may be enclosed within a plastic membrane. In one embodiment of the invention, a stack may be enclosed within a heat shrinkable membrane and the membrane caused to shrink about the stack. In this way, any leakage of fluids from the stack may be prevented or retarded by the membrane. A variety of different membranes may be utilized including composite membranes made up of barrier film and heat shrinkable puncture resistant film or bubble wrap covered by shrink wrap film. Any openings formed in the enclosure may be closed using plastic tape or heat sealing techniques. A leak detector may be provided within the enclosure for detecting leaks including gas leaks from within the stack.

27 Claims, 12 Drawing Sheets

FUEL CELL ISOLATION SYSTEM

BACKGROUND

This invention relates generally to techniques for isolating fuel cells from the external environment.

A fuel cell is an electrochemical device that converts chemical energy produced by a reaction directly into electrical energy. A fuel cell catalytically reacts a fuel to create an electric current. The catalytic reaction causes electrons to be removed from the fuel elements. Fuel cells generally include an electrolyte material sandwiched between two electrodes called the anode and the cathode. Fuel passes over the anode and oxygen passes over the cathode. The fuel is catalytically split into ions and electrons. The electrons go through a external circuit to serve an electric load while the ions move through the electrolyte towards the oppositely charged electrode. At the electrode, the ions combine to create byproducts such as water and carbon dioxide.

Thus, fuel cells generally include a power section which has just been described and in addition may provide DC power to a power conditioner that outputs AC power. A fuel processor includes a reformer that receives the fuel such as natural gas and produces a hydrogen rich gas to the power section. While the electrochemical reaction in the fuel cell is similar to a battery, unlike the battery, which runs down, fuel cells continue to create electricity and thermal energy for so long as fuel and oxygen sources are supplied to sustain the reaction.

For example, one type of fuel cell includes a proton exchange membrane (PEM), that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

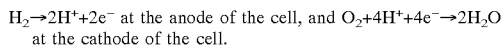

$H_2 \rightarrow 2H^+ + 2e^-$ at the anode of the cell, and $O_2 + 4H^+ + 4e^- \rightarrow 2H_2O$ at the cathode of the cell.

Because a single fuel cell typically produces a relatively small voltage (around 1 volt, for example), several serially connected fuel cells may be formed out of an arrangement called a fuel cell stack to produce a higher voltage. A fuel cell stack 5 shown in FIG. 1 may include different plates 6 that are stacked one on top of the other in the appropriate order, and each plate may be associated with more than one fuel cell 7 of the stack 5. The plates 6 may be made from a graphite composite or metal material (as examples) and include various channels and orifices to, as examples, route the above-described reactants and products through the fuel cell stack. Several PEMs 8 (each one being associated with a particular fuel cell) may be dispersed throughout the stack between the anodes and cathodes of the different fuel cells. The anode 3 and the cathode 4 may each be made out of an electrically conductive gas diffusion material, such as a carbon cloth or paper material, for example. A rod 9 may connect the stack to a spring mounting foundation 2.

Referring to FIG. 2, as an example, a fuel cell stack 10 may be formed out of repeating units called plate modules 12. In this manner, each plate module 12 includes a set of composite plates that may form several fuel cells. For example, for the arrangement depicted in FIG. 2, an exemplary plate module 12a may be formed from a cathode cooler plate 14, a bipolar plate 16, a cathode cooler plate 18, an anode cooler plate 20, a bipolar plate 22 and an anode cooler plate 24 that are stacked from bottom to top in the listed order. The cooler plate functions as a heat exchanger by routing a coolant through flow channels in either the upper or lower surface of the cooler plate to remove heat from the plate module 12a. The surface of the cooler plate that is not used to route the coolant includes flow channels to route either hydrogen (for the anode cooler plates 20 and 24) or oxygen (for the cathode cooler plates 14 and 28) to an associated fuel cell. The bipolar plates 16 and 22 include flow channels on one surface (i.e., on the top or bottom surface) to route hydrogen to an associated fuel cell and flow channels on the opposing surface to route oxygen to another associated fuel cell. Due to this arrangement, each fuel cell may be formed in part from one bipolar plate and one cooler plate, as an example.

For example, one fuel cell of the plate module 12a may include an anode-PEM-cathode sandwich, called a membrane-electrode-assembly (MEA), that is located between the anode cooler plate 24 and the bipolar plate 22. In this manner, the upper surface of the bipolar plate 22 includes flow channels to route oxygen near the cathode of the MEA, and the lower surface of the anode cooler plate 24 includes flow channels to route hydrogen near the anode of the MEA.

As another example, another fuel cell of the plate module 12a may be formed from another MEA that is located between the bipolar plate 22 and the cathode cooler plate 20. The lower surface of the bipolar plate 22 includes flow channels to route hydrogen near the anode of the MEA, and the upper surface of the cathode cooler plate 24 includes flow channels to route oxygen near the cathode of the MEA. The other fuel cells of the plate module 12a may be formed in a similar manner.

In addition to the PEM type of fuel cells, there are a number of other types as well. Solid oxide fuel cells use ceramic solid phase electrolyte. A molten carbonate fuel cell uses a molten carbonate salt mixture as its electrolyte. Finally a phosphoric acid fuel cell uses liquid phosphoric acid as the electrolyte.

Generally, each type of fuel cell is subject to leakage. A number of fuel cells are adapted to home, vehicular or other portable uses. In these applications, leakage may be considered to be undesirable. For example, concentrations of gaseous fuel cell fuels such as hydrogen may be explosive. Fuel cell systems may also include other components that carry potentially explosive gasses, such as reforming systems that transform hydrocarbons, natural gas for example, into hydrogen. Fuel cells systems may also utilize hydrocarbon coolants that might pollute the environment if spilled. In addition, the transport of the fuel cell for assembly or for ultimate use may be complicated by leaking fluids, including liquids and gasses.

Thus, there is a continuing need for better ways to control the leakage of fluids from fuel cells.

SUMMARY

In one embodiment of the invention, an assembly includes fuel cell plates arranged to form a fuel cell, the plates establishing a manifold passageway to communicate a fluid for the fuel cell. At least one of the plates includes flow channels to communicate the fluid through the fuel cell. A plastic membrane enclosure substantially surrounds the plates. In some embodiments, the plastic membrane enclosure may form an environmental backup seal around various system components. Some embodiments may also provide an isolation seal to isolate potential ignition sources within a fuel cell system.

Advantages and other features of the invention will become apparent from the following description, from the drawing and from the claims.

DETAILED DESCRIPTION

Figure 10:
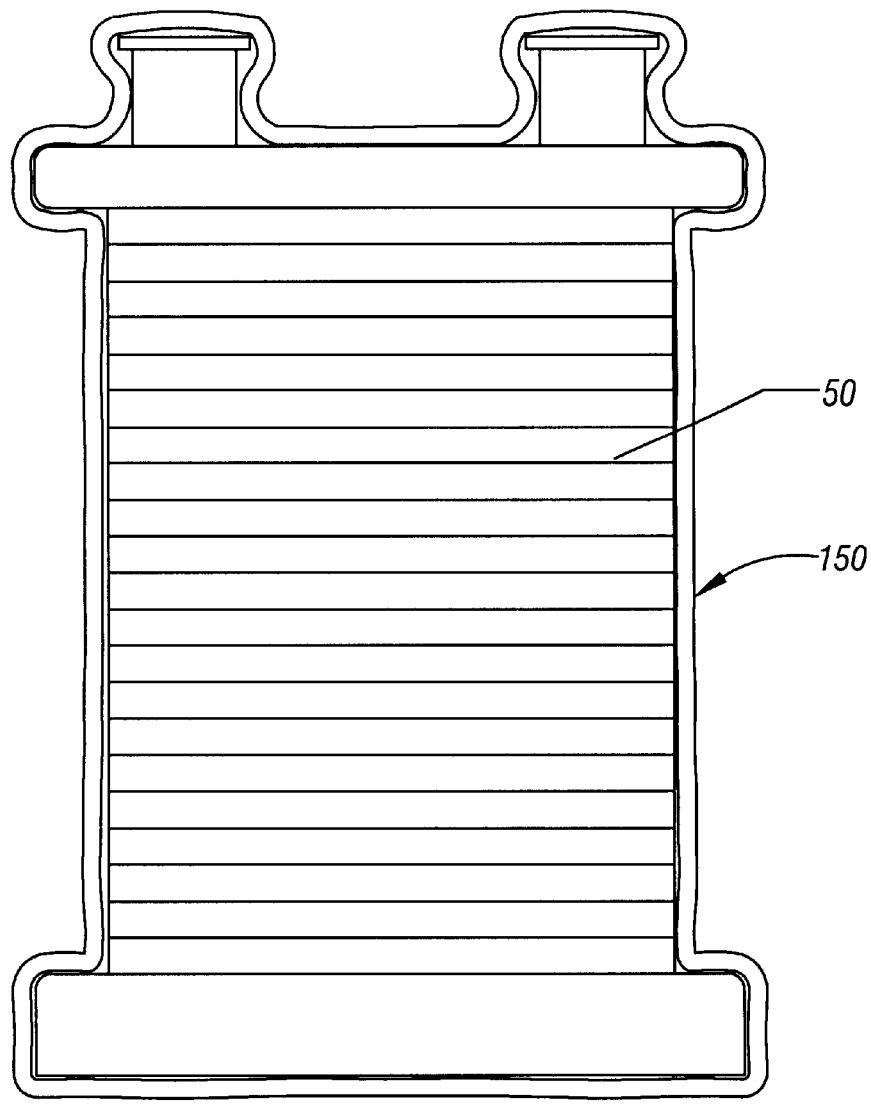
FIG. 10 is a cutaway front elevational view of the enclosed fuel cell stack.

Referring to FIG. 10, a fuel stack 50 according to one embodiment of the invention may include a plurality of fuel cell plates forming a stack enclosed within a plastic enclosure 150. The enclosure 150, as will be explained in more detail hereinafter, controls fluid leakage from the fuel cell stack 50 to the external environment.

Figure 1:
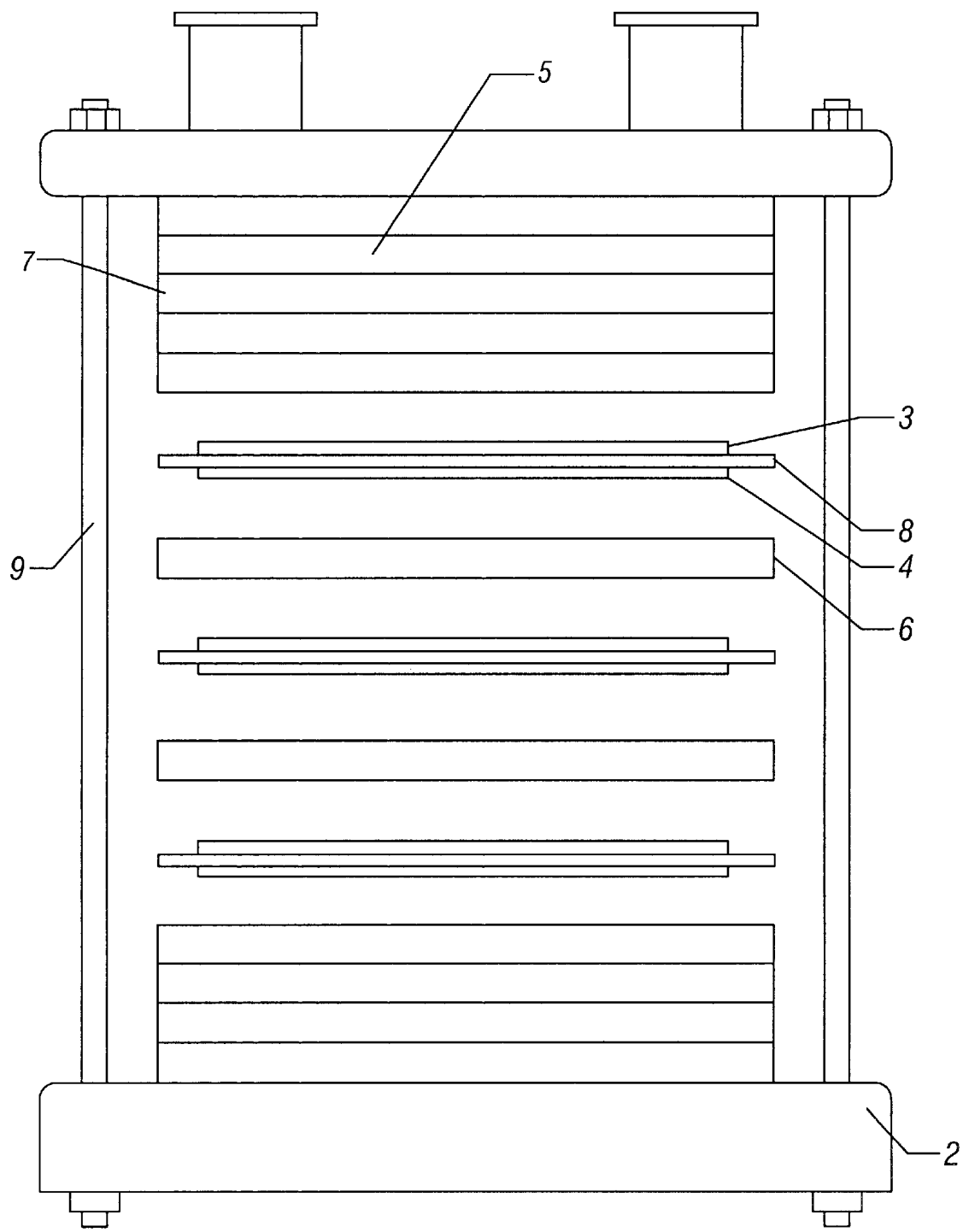
FIG. 1 is a front elevational view of a fuel cell stack, partially exploded, according to the prior art.
Figure 2:
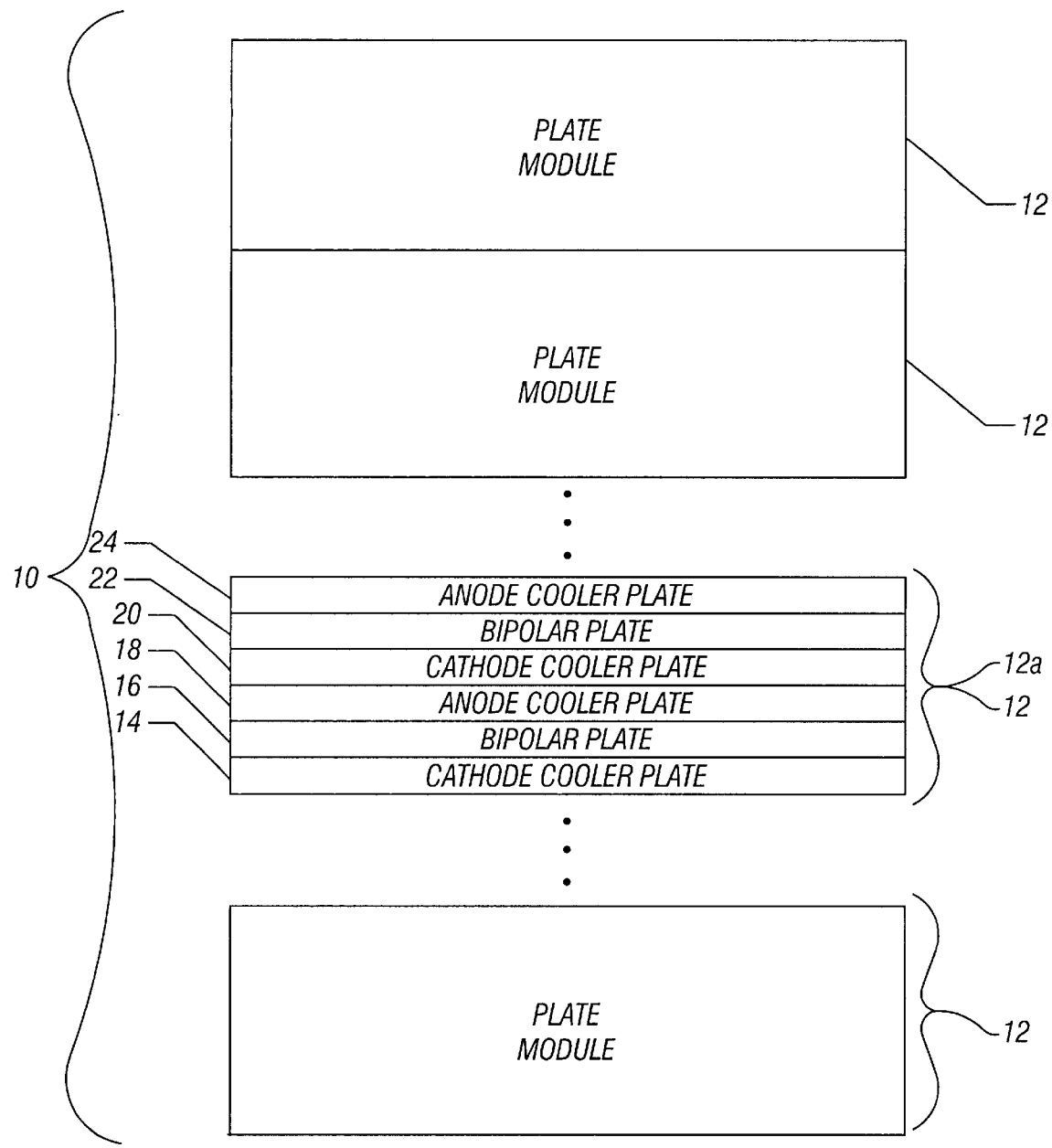
FIG. 2 is a schematic diagram illustrating a fuel cell stack according to the prior art.
Figure 3:
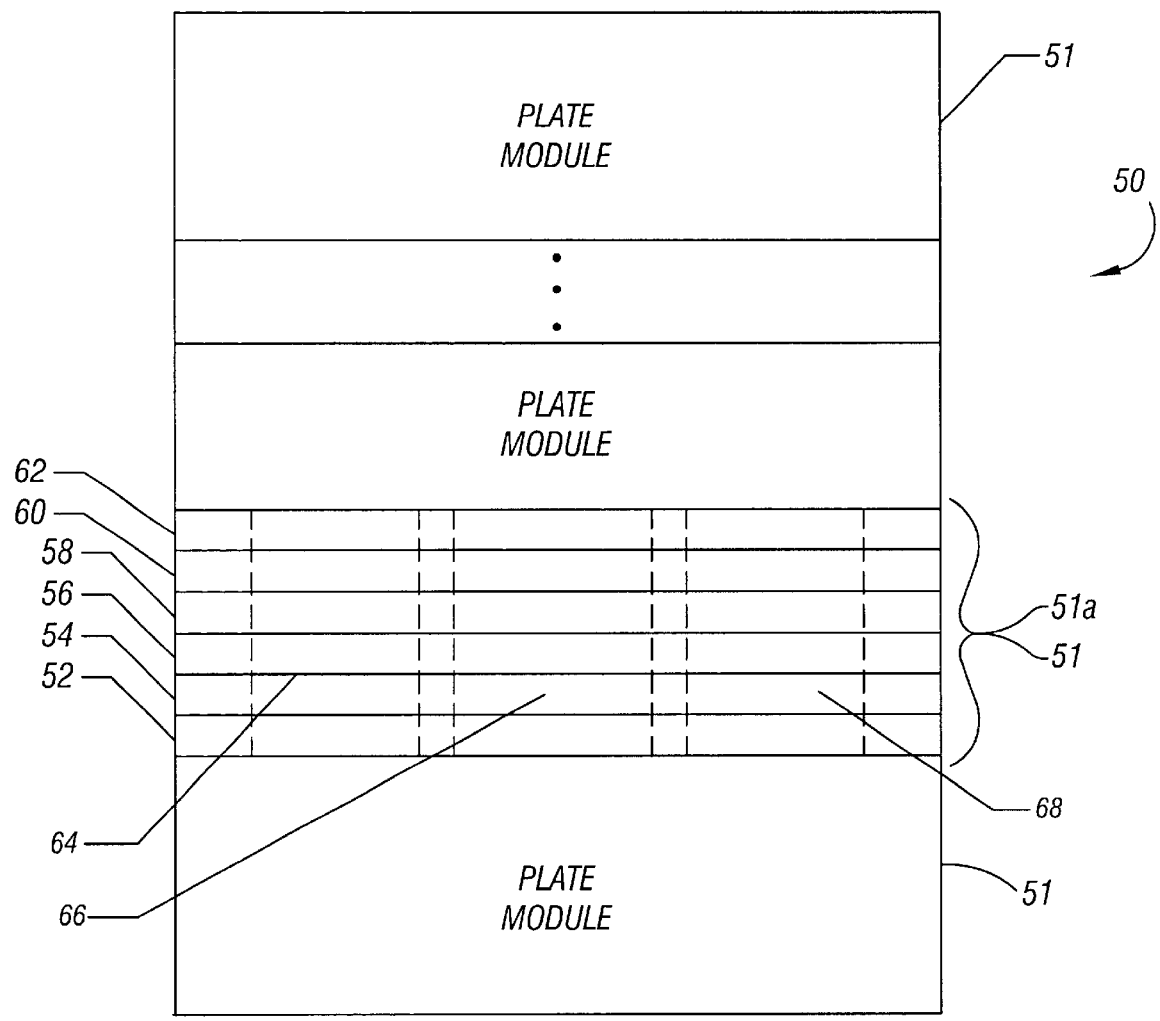
FIG. 3 is a side view of a fuel cell stack.

The fuel cell stack 50, shown in FIG. 3, may be formed from repeating units called plate modules 51. An exemplary plate module 51a includes flow plates (graphite composite plates, for example) that include flow channels to form several (four, for example) fuel cells. For example, the plate module 51a may include the following flow plates: bipolar plates 54 and 60; cathode cooler plates 52 and 58; and anode cooler plates 56 and 62.

Figure 4:
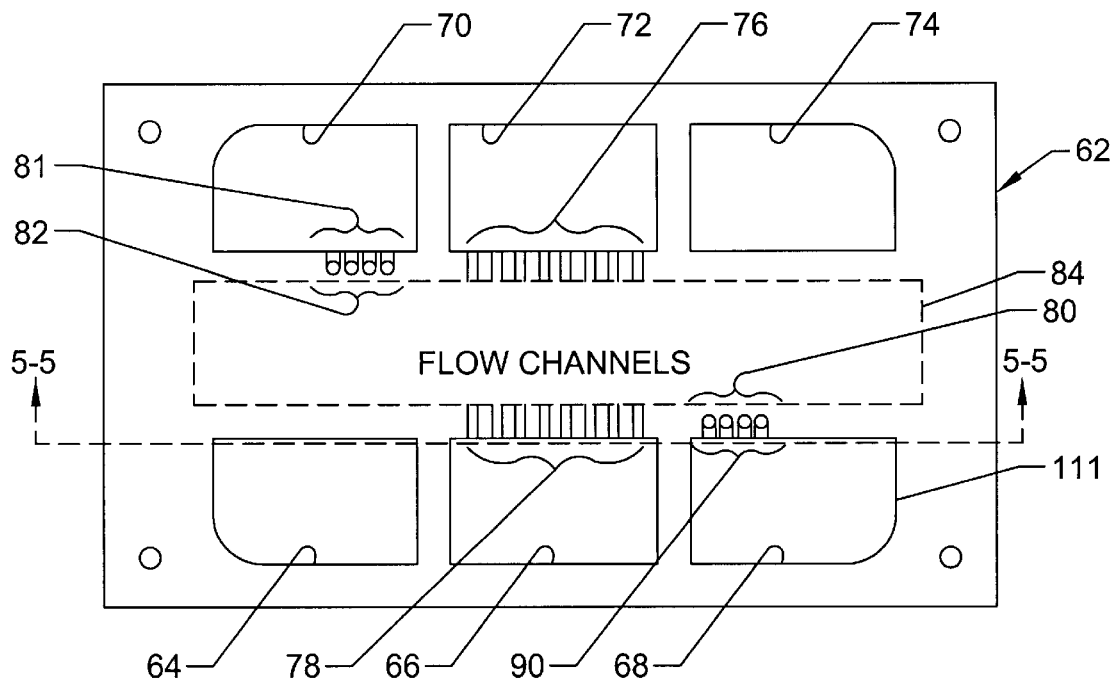
FIG. 4 is a top view of an anode cooler plate of the fuel cell stack of FIG. 3.

Referring also to FIG. 4 that depicts a top view of the anode cooler plate 62, the plates include openings that form a manifold for communicating the reactants for the fuel cells and a coolant (Therminol made by Monsanto Chemical Company, for example) to and from the various surface flow channels of the plates. In this manner, the plates may include aligned openings that form a vertical inlet passageway 70 (see FIG. 4) of the manifold for introducing hydrogen to the plate module 51a, and the plates may include aligned openings that form a vertical outlet passageway 68 of the manifold for removing hydrogen from the plate module 51a. Similarly, openings in the plates may form vertical inlet 74 and outlet 64 passageways of the manifold for communicating oxygen (via an air flow); and the plates may include aligned openings that form vertical inlet 72 and outlet 66 passageways of the manifold for communicating the coolant.

As an example of the fluid flows through the plate module 51a, the anode cooler plate 62 may include horizontal flow channels 84 on its upper surface (depicted in FIG. 4) through which the coolant flows to remove beat from the stack 50. For purposes of furnishing hydrogen to a membrane electrode assembly (MEA) that is located between the anode cooler plate 62 and the bipolar plate 60 (see FIG. 3), the hydrogen flows through horizontal flow channels 85 (see FIG. 5) on the lower surface of the anode cooler plate 62. Thus, the coolant flows through the upper surface flow channels 84 of the anode cooler plate 62, and hydrogen flows through the lower surface flow channels 85 of the anode cooler plate 62.

Figure 5:
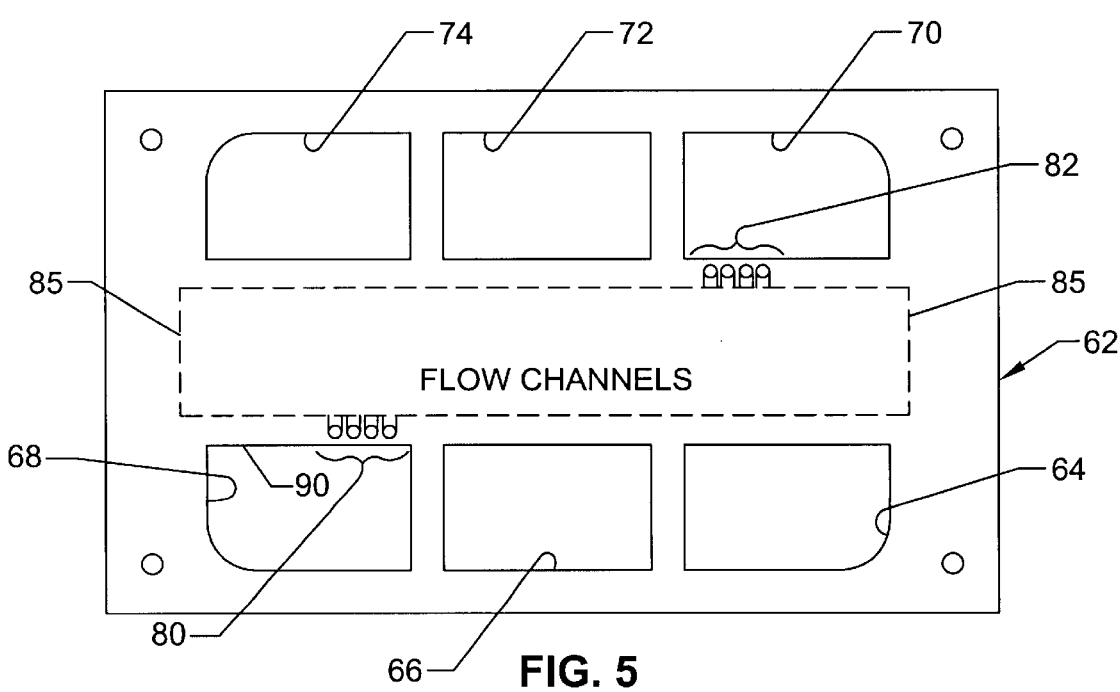
FIG. 5 is a bottom view of the anode cooler plate of the fuel cell stack of FIG. 3.

To establish communication between the various horizontal flow channels and the vertical manifold passageways, the plates includes horizontal ports that are formed either in the upper or bottom surfaces of the plates. For example, referring to FIG. 6, to communicate with the hydrogen outlet passageway 68 (see also FIG. 4), the plates include sets 90 of horizontal outlet ports. Although the set 90 of ports is depicted in FIG. 5 as including four ports, the set 90 of ports may include fewer or more ports. To communicate with the coolant outlet passageway 66 (see also FIG. 3) and the oxygen outlet passageway 64 (see also FIG. 3), the plates includes sets 78 and 120, respectively, of horizontal outlet ports. The plates also include sets of horizontal inlet ports (not shown in FIG. 6) to communicate with the inlet manifold passageways 70, 72 and 74.

Figure 6:
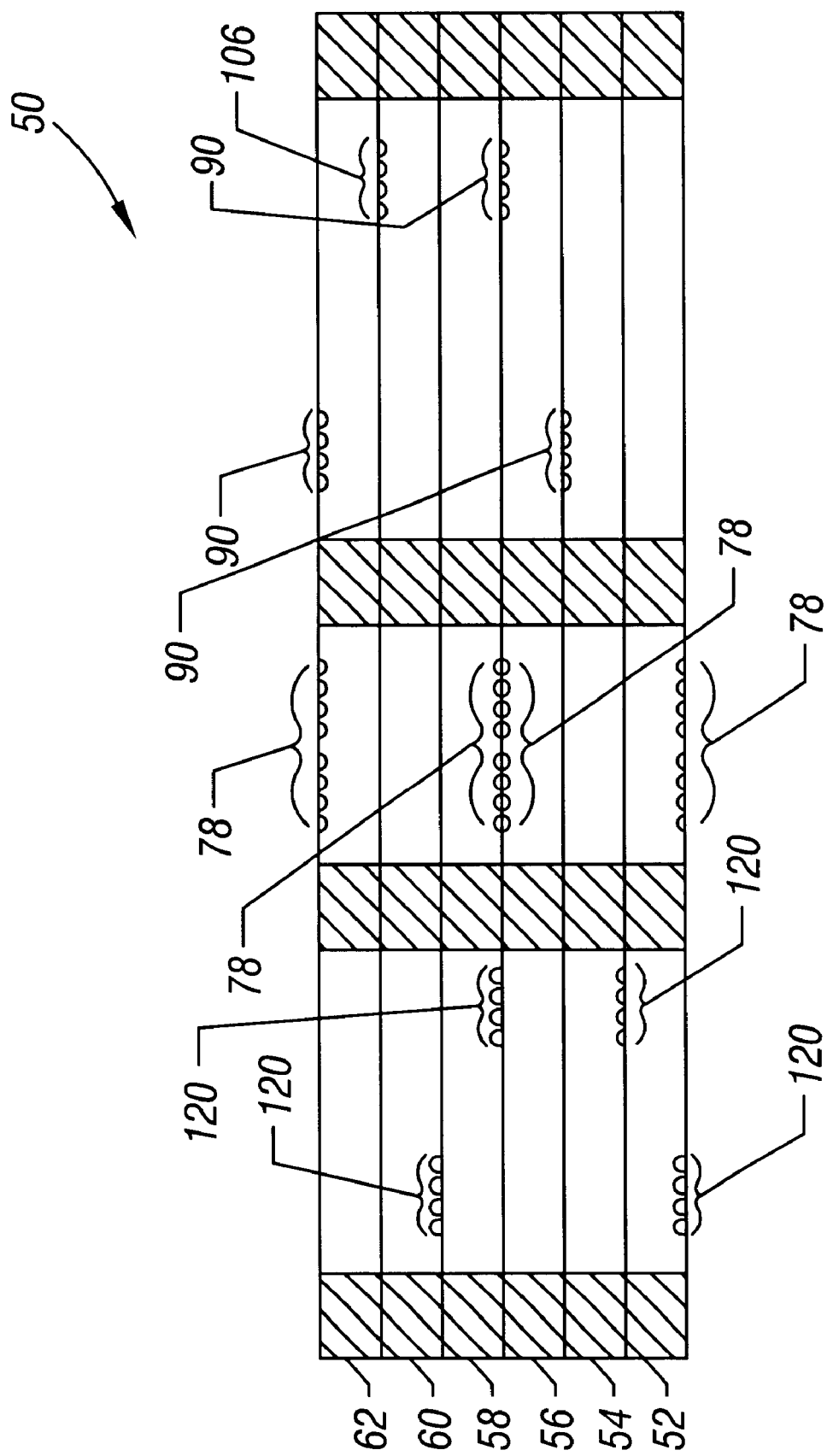
FIG. 6 is a cross-sectional view of the plate module taken along line 5—5 of FIG. 3.

As an example, referring both to FIGS. 4 and 6, the upper surface of the anode cooler plate 62 includes a set 76 of horizontal outlet ports to receive coolant from the inlet passageway 72 and to communicate the coolant to the upper surface flow channels 84 of the anode cooler plate 62. In this manner, the coolant flows through the flow channels 84 to remove heat from the plate module 51a, and the coolant exits the flow channels 84 through a set 78 of horizontal outlet ports into the coolant outlet passageway 66. The upper surface of the anode cooler plate 62 also includes a set 81 of horizontal inlet ports that receive hydrogen from the hydrogen inlet passageway 70. Because the flow channels 85 (see FIG. 5) for the hydrogen are located on the lower surface of the anode cooler plate 62, the plate 62 includes vertical orifices 82 that extend through the plate 62 to route the incoming hydrogen into the flow channels 85. The hydrogen flows through the flow channels 85 and is subsequently routed to the upper surface of the plate 62 through vertical orifices 80. The hydrogen exits the plate 62 via a set 90 of horizontal outlet ports into the outlet passageway 68. Flows may be directed to the other plates of the plate module 51a in a similar fashion.

Figure 7:
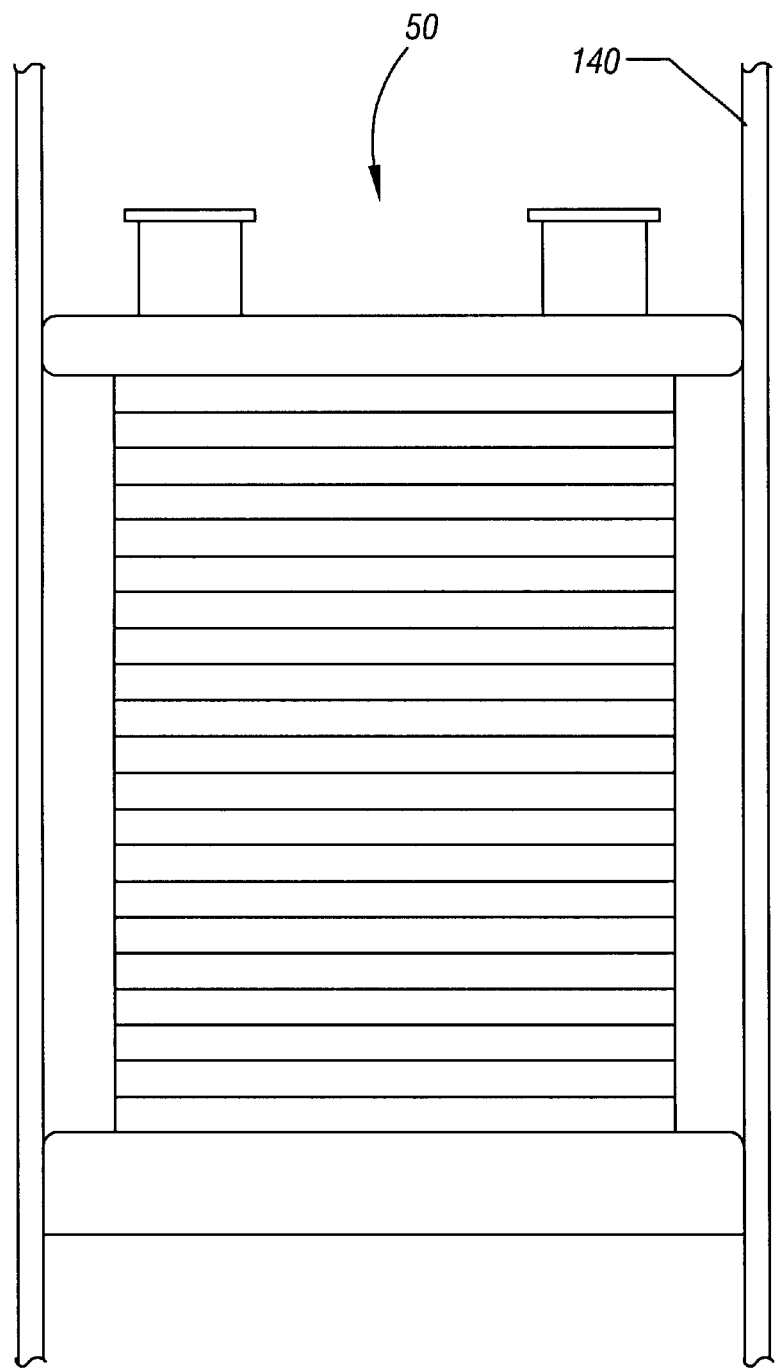
FIG. 7 is a cut away front elevational view of one embodiment of the present invention with a plastic tubing surrounding a fuel cell stack.

The stack 50 may be enclosed within a tubular plastic film or membrane 140, shown in FIG. 7. The membrane 140 may be made of a plastic polymer material, which in response to heat, shrinks to a much smaller diameter and length. A variety of relatively thick, substantially gas impermeable thermally shrinkable films are commercially available. For example, a number of such films are available from Sealed Air Corporation, Saddle Brook, N.J. 07663, including as examples the Cryovac® BDF 2001 barrier shrink film and the Cryovac® D-955 high strength shrink film. The membrane 140 may also be fitted with additional internal layers, for example a foil layer (not shown), to improve the gas impermeability of the system.

The processes for forming the tubular film or membrane 140 are well known. Generally, these films are formed into a tube from a continuous sheet of plastic. In some cases, the sheet of plastic film may be seamed to form the tube and in other cases, a circular extruder may be used to form an integral plastic tube.

Figure 7A:
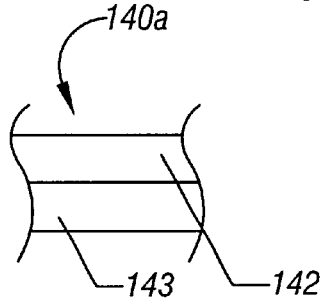
FIG. 7A is an enlarged cross-sectional view through the membrane shown in FIG. 7.

In general, it is advantageous to utilize a shrink film which can be exposed to temperatures, in use, in the range of 60–150° C., or for example, in storage down to −40° C. Such temperature ranges are merely exemplary. It is possible to choose a membrane material to accommodate other ranges as desired. Moreover, it is desirable that the film be chosen to be substantially gas impermeable. For example, it is desirable that the film retard the transmission of relatively large gas particles such as those associated with natural gas. In one embodiment of the present invention, shown in FIG. 7A, a composite membrane 140a may be made of an internal heat shrinking gas barrier layer 142 and a tougher, external heat shrinking, puncture resistant layer 143 may be used.

Figure 8:
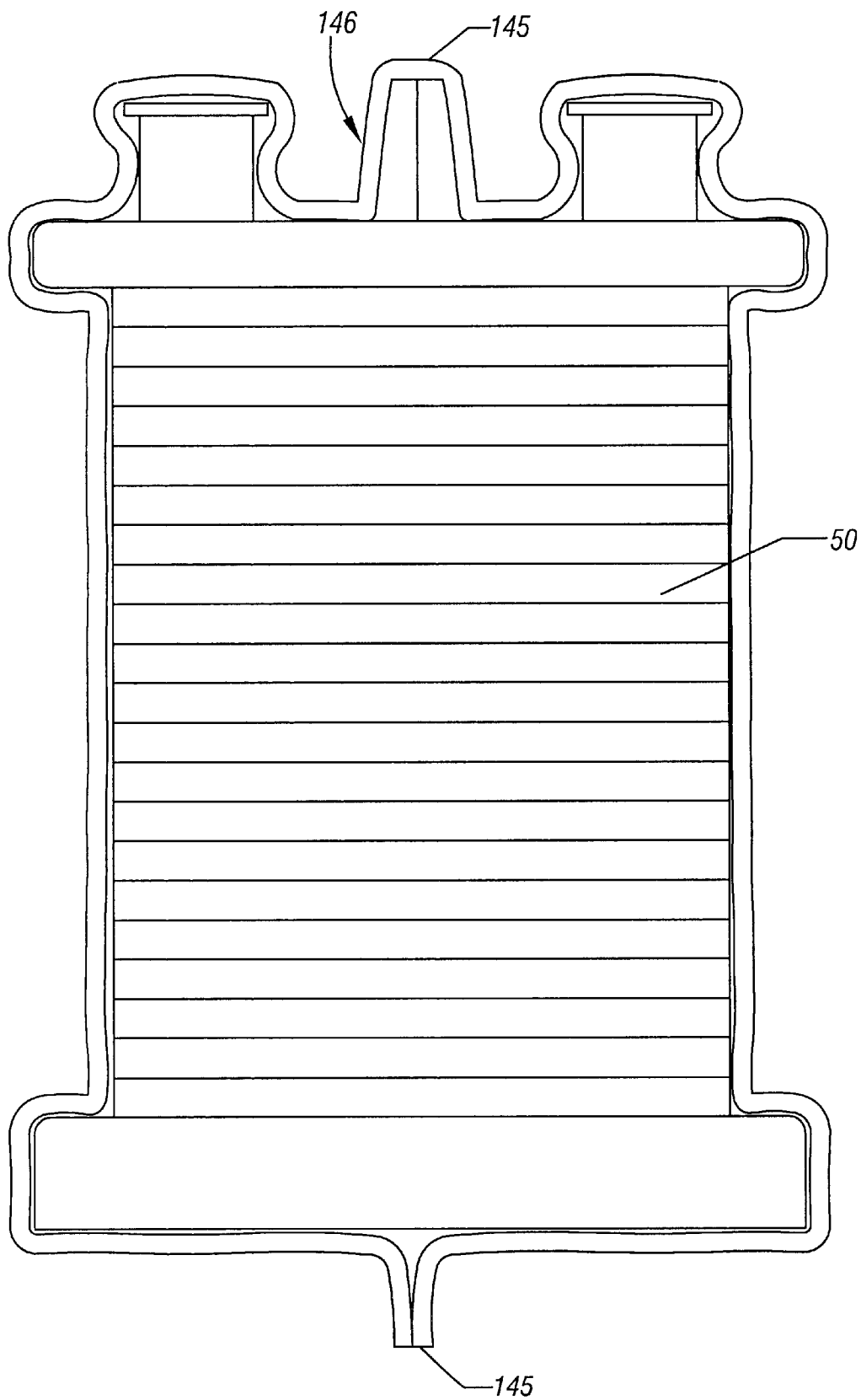
FIG. 8 is a cutaway front elevational view of the embodiment shown in FIG. 7 after the membrane has been caused to envelop the fuel cell stack.

After the composite of the stack 50 and membrane 140 have been exposed to thermal treatment, for example in a heat shrinking tunnel, the membrane 140 shrinks to the configuration shown in FIG. 8 in one embodiment of the invention. The ends 145 of the membrane 140 may in effect come together and either thermally fuse or come into close juxtaposition, forming an extension 146 on both ends 145 of the membrane 140 and both ends of the stack 50. In some cases, in order to support the stack 50 during this process, a pedestal (not shown) may extend through the open ends 145 of the membrane 140. In such case, the pedestal may eventually be constrained within the extensions 146.

Figure 9:
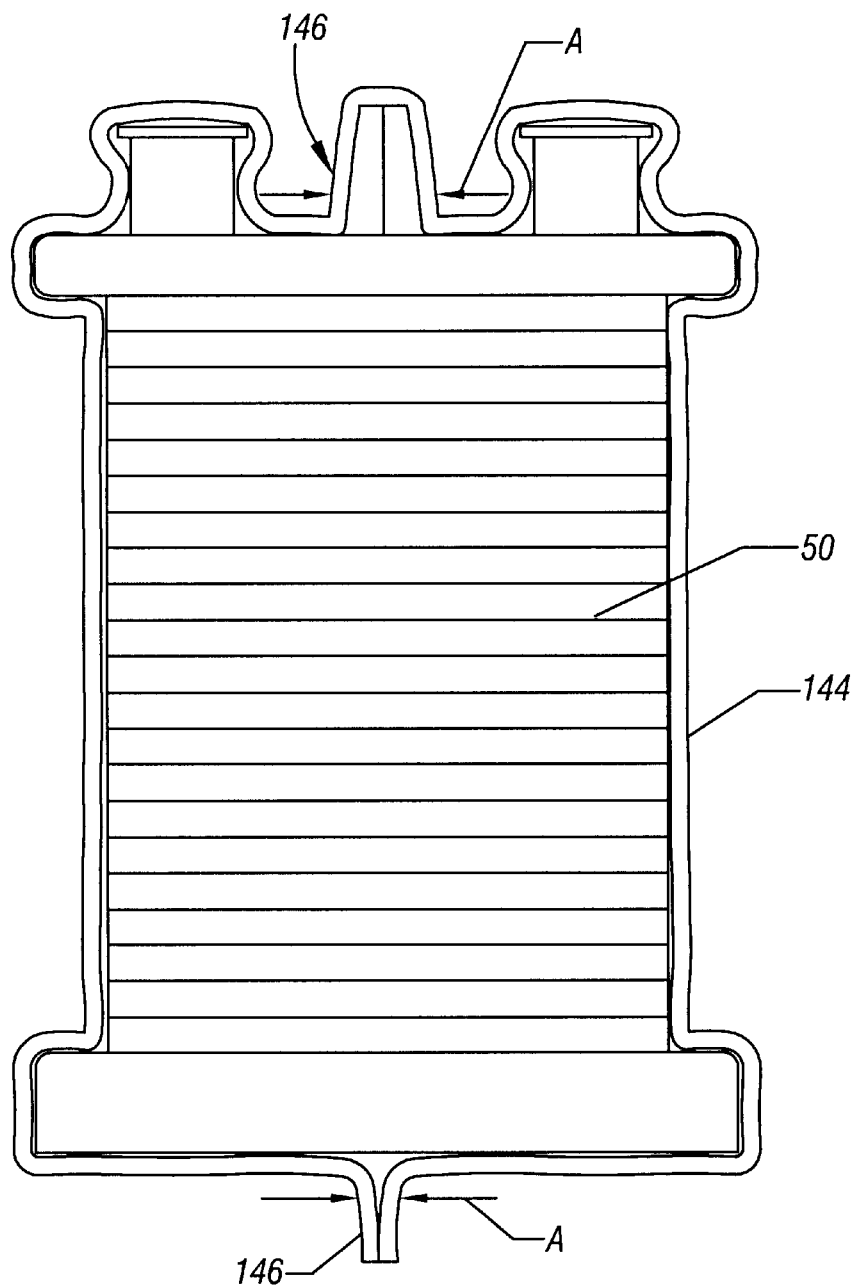
FIG. 9 is a cutaway front elevational view corresponding to FIG. 8 indicating how excess plastic material is removed.
Figure 9A:
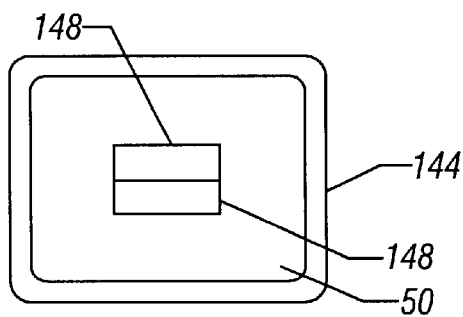
FIG. 9A is a bottom view of the embodiment shown in FIG. 9.

Referring next to FIG. 9, excess material may be removed by cutting as indicated by the arrows "A" in FIG. 9. In an embodiment in which a pedestal is involved, the pedestal may be removed and the opening remaining from the positioning of the pedestal may be closed by heat sealing using a conventional heat sealer such as a handheld heat sealer. Any remaining pipe passages or openings may be covered using plastic film adhesive tape 148, as indicated in FIG. 9A.

As a result, as shown in FIG. 10, the stack 50 may be substantially enclosed within a substantially gas impermeable enclosure 150. The enclosure 150 may be effective in controlling the outflow of liquids and in limiting or retarding the inflow or outflow of gaseous particles. Particularly in connection with natural gas particles, the enclosure 150 may either constrain or retard the passage of such particles. In addition to creating a stack which may be more easily transportable, the resulting composite may be safer and more desirable for the end user.

If there is any leakage of fuel cell reactants from the stack, such leakage may be contained or retarded by the enclosure 150. The enclosure 150 may also protect the stack 50 and prevent shorting of the plates in the stack. Such protection of the stack may also improve the ability of the stack to be handled during system assembly.

Figure 10A:
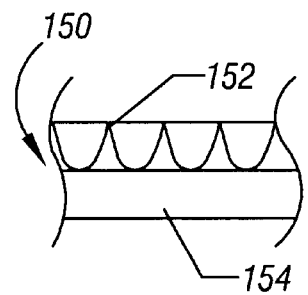
FIG. 10A is an enlarged cross-sectional view through the enclosure of FIG. 10 in accordance with an alternate embodiment.

In another embodiment of the present invention, the membrane 144 may be particularly thick, for example on the order of 6 to 7 mils. Alternatively, more than one layer may be applied around the stack 50. For example, as shown in FIG. 10A, one layer 152 may be a padding material such as a bubble wrap material. The bubble wrap may be retained around the stack 50 using a heat shrunken plastic membrane 154.

In addition, additional fuel cell components may be wrapped as well. In still another embodiment, portions of the circuitry of the fuel cell may be enclosed within a plastic membrane to provide isolation from any potential gas leaks within the system.

Figure 11:
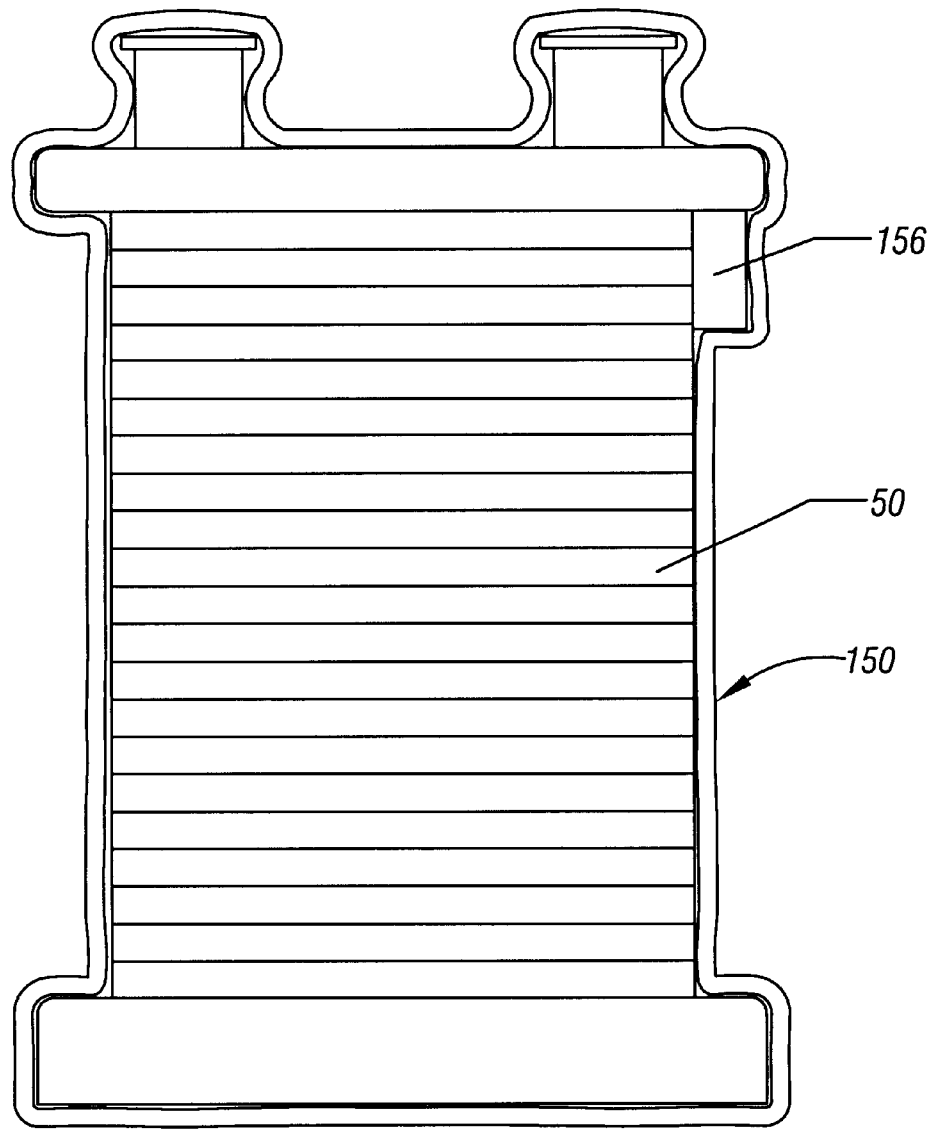
FIG. 11 is a cutaway front elevational view of another embodiment.
Figure 11A:
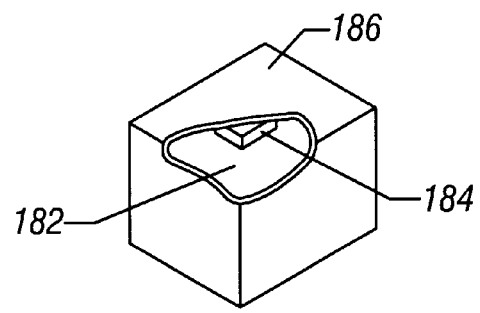
FIG. 11A is a cutaway perspective view of an enclosed reformer.

If desired, a leak detection system 156 may be provided within the enclosure 150, as shown in FIG. 11. For example, the leak detection system may detect the leakage of fluids inside the enclosure 150. The enclosure 150 may retard the outflow of gas making it more easy to sense the leakage. A variety of leak detection systems may be utilized including gas leak detectors available for example from SF Detection, Poole, Dorset, England (www.interviz.com). In addition, the natural gas fuel cell reformer 182 shown in FIG. 11A may be enclosed within a membrane 186. A natural gas leak detector 184 may be enclosed within the membrane.

Figure 12:
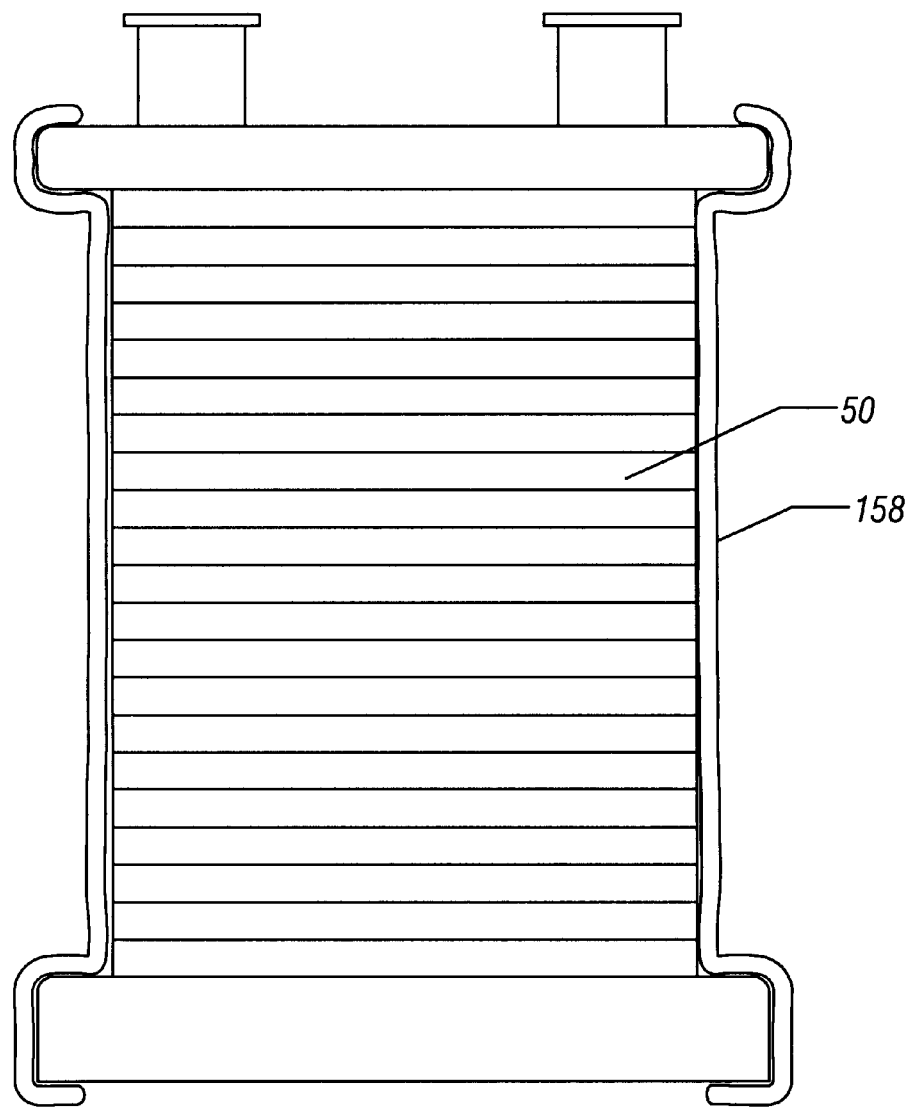
FIG. 12 is a cutaway front elevational view of still another embodiment.
Figure 12A:
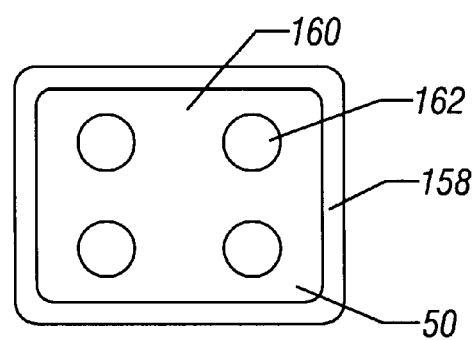
FIG. 12A is a top plan view of the embodiment shown in FIG. 12.

Referring next to FIG. 12, in still another embodiment of the present invention, a tubular membrane, previously situated about the stack 50, is caused to shrink about the stack to form the membrane 158. However, in this case, the amount of shrinking which occurs is less than in previously depicted embodiments. This may be achieved by utilizing a heat shrinking film which shrinks less than that used in other embodiments. As a result, the top and bottom of the stack 50 are not completely covered by the shrunk membrane 158. As shown in FIG. 12A for example, an opening 160 may expose the stack 50. As an example, the opening 160 may expose a portion of the service end plate which includes a plurality of service tubes 162.

Figure 13:
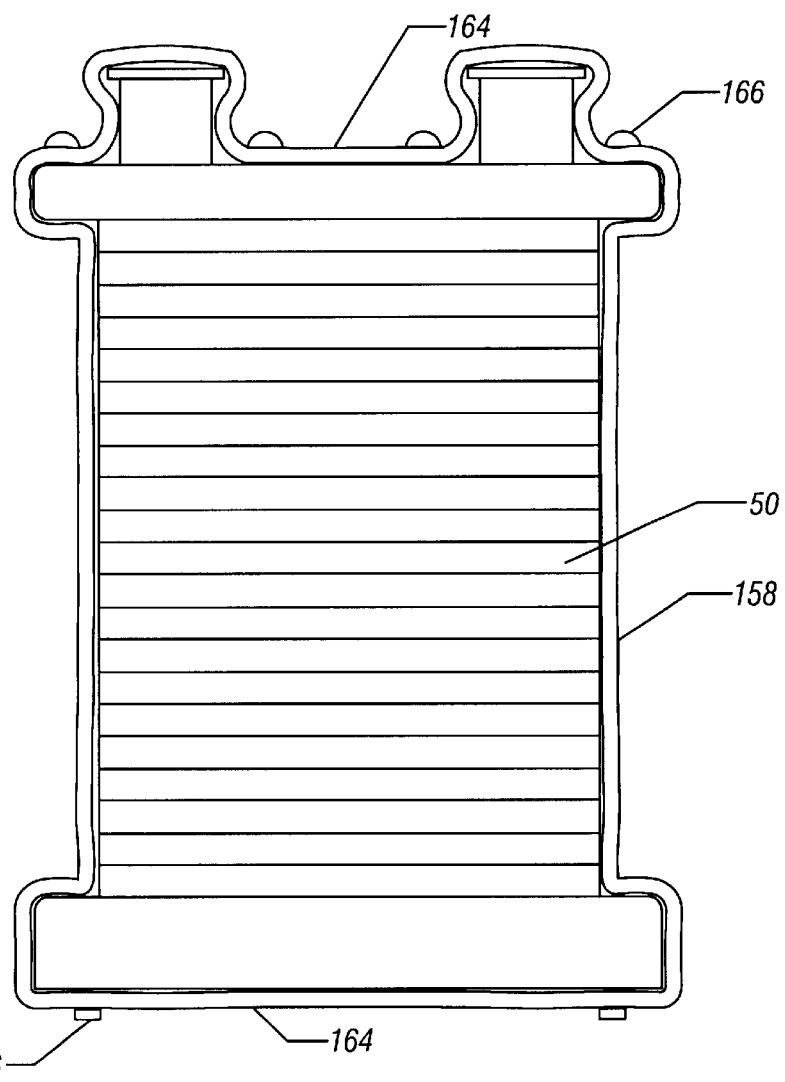
FIG. 13 is a cutaway front elevational view of the embodiment shown in FIG. 12 after further processing.
Figure 13A:
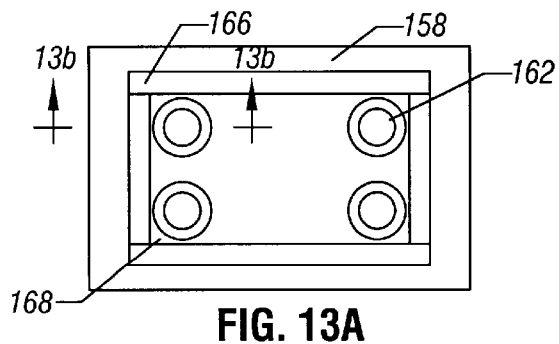
FIG. 13A is a top plan view of the embodiment shown in FIG. 13.

Referring to FIG. 13, the opening 160 defined in the membrane 158 may be closed using a patch 164. The patch may be secured to the membrane 158 using adhesive tape 166 or other techniques such as heat sealing. Thus, referring to FIG. 13A, the adhesive tape 166 provides a seam between the patch 164 and the original heat shrunk membrane 158.

Figure 13B:
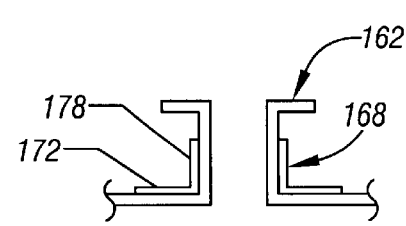
FIG. 13B is a cross-sectional view taken generally along the line 13B in one variation of the embodiment shown in FIG. 13A.
Figure 13C:
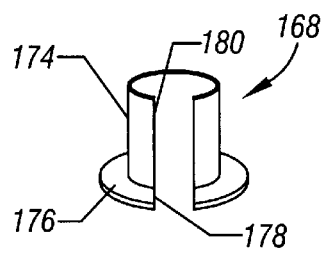
FIG. 13C is a perspective view of a collar which may be used around openings in the embodiment shown in FIG. 13A.

In one alternate embodiment, a collar 168 may be utilized around each of the tubes 162. As shown in FIG. 13B, the collar 168 may have an open top hat configuration with a split, tubular portion 174 and brim 176. The tubular portion 174 and the brim 176 may have adhesive surfaces which secure the collar 168 to the patch 164 and the tube 162. Thus, the opening created by the tube 162 may be sealed by wrapping the collar 168 about the opening so that the flange 178 overlaps on the brim 176 and the edges 180 on either side of a split through the collar 168 overlap so as to close the split. In this way, the membrane may be sealed around tubes or passages.

It will also be appreciated that the plastic membrane environmental backup seals of the present invention may be applied to various fuel cell subsystems. For example, a circuitry subsystem for controlling the fuel cell operation and/or power conditioning may be a potential ignition point for any explosive gasses that might leak within the fuel cell system. Thus, such a circuitry subsystem, or other fuel cell system elements that may serve as potential ignition points, may be sealed for added safety, or simply to protect circuitry components or other fuel cell system components. Likewise, where a fuel cell system includes a reformer system for processing a hydrocarbon fuel, such as natural gas or methanol, such subsystems may be entirely or partially sealed under the present invention to provide added safety and system component protection.

In the preceding description, directional terms, such as "vertical" and "horizontal", were used for reasons of convenience to describe the fuel cell stack and its associated components. However, such orientations are not needed to practice the invention, and thus, other orientations are possible in other embodiments of the invention. For example, the fuel cell stack 50 and its associated components, in some embodiments, may be tilted by 90°.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An assembly comprising:
   fuel cell plates arranged to form a fuel cell stack, the plates establishing a manifold passageway to communicate a reformed fuel for the fuel cell stack and at least one of the plates including flow channels to communicate the fuel through the fuel cell stack; and
   a plastic membrane enclosure formed from a shrink film material substantially surrounding said fuel cell stack.

2. The assembly of claim 1, wherein the fluid comprises a reactant.

3. The assembly of claim 2, wherein the reactant comprises hydrogen.

4. The assembly of claim 1, wherein the fluid comprises a coolant.

5. The assembly of claim 1 wherein openings in said enclosure are covered by a plastic tape.

6. The assembly of claim 1 wherein openings in said enclosure are closed by heat sealing.

7. The assembly of claim 1 wherein said enclosure is formed of a pair of film layers.

8. The assembly of claim 7 wherein one of said film layers is a barrier film layer.

9. The assembly of claim 8 wherein one of said film layers is a puncture resistant layer.

10. The assembly of claim 7 wherein one of said layers is bubble wrap.

11. The assembly of claim 1 including a leak detector contained within said enclosure.

12. The assembly of claim 11 wherein said leak detector is a gas leak detector.

13. A method comprising:
    using fuel cell plates to form a fuel cell stack, the fuel cell plates including channels to communicate a fluid for the fuel cell stack and being arranged to form a manifold passageway to communicate the fluid; and
    enclosing said fuel cell stack in a plastic membrane.

14. The method of claim 13 including enclosing said plates in a plastic membrane and causing said membrane to shrink about said plates.

15. The method of claim 14 including closing any openings in said membrane using adhesive tape.

16. The method of claim 15 including closing any openings in said membrane using a heat sealer.

17. The method of claim 13 including enclosing said plates within a pair of layers, one of said layers being a shrinkable layer.

18. The method of claim 17 including enclosing said plates in a pair of layers, one of said layers being a barrier layer and the other of said layers being a puncture resistant layer.

19. The method of claim 13 including enclosing said plates in a pair of layers, one of said layers being a bubble wrap material and the other of said layers being a shrink wrap material.

20. The method of claim 13 including enclosing a leak detector within said plastic membrane.

21. The method of claim 20 including testing for leaks within said membrane.

22. The method of claim 21 including testing for gas leaks within said membrane.

23. The method of claim 13 including enclosing a portion of a reformer subsystem in a plastic membrane.

24. The method of claim 13 including enclosing a portion of a circuitry subsystem in a plastic membrane.

25. A fuel cell system comprising:
    a reformer;
    a natural gas leak detector; and
    a membrane enclosure surrounding said reformer and said leak detector.

26. The fuel cell system of claim 25 wherein said enclosure is formed of shrink film.

27. The fuel cell system of claim 25 including a fuel cell stack enclosed within a plastic membrane.

\* \* \* \* \*